US007255948B2

(12) United States Patent
Lundsgaard et al.

(10) Patent No.: US 7,255,948 B2
(45) Date of Patent: Aug. 14, 2007

(54) FUEL-CELL REACTANT DELIVERY AND CIRCULATION DEVICE

(75) Inventors: Jorgen Schjerning Lundsgaard, Svendborg (DK); John Kaas, Svendborg (DK); Madeleine Odgaard, Odense M (DK); David M. Thomas, Stenstrup (DK)

(73) Assignee: IRD Fuel Cells A/S, Svendborg (DK)

( * ) Notice: Subject to any disclaimer, the term of this patent is extended or adjusted under 35 U.S.C. 154(b) by 123 days.

(21) Appl. No.: 10/997,256

(22) Filed: Nov. 24, 2004

(65) Prior Publication Data

US 2005/0118492 A1      Jun. 2, 2005

Related U.S. Application Data

(60) Provisional application No. 60/525,805, filed on Nov. 28, 2003.

(51) Int. Cl.
  *H01M 8/04* (2006.01)
(52) U.S. Cl. .............................. 429/17; 429/31; 429/38; 429/39
(58) Field of Classification Search ................ 429/30, 429/34, 39, 38, 44, 13, 17, 22
  See application file for complete search history.

(56) References Cited

U.S. PATENT DOCUMENTS

| 4,469,579 | A |   | 9/1984  | Covitch et al. ............... 204/283 |
| 4,826,554 | A |   | 5/1989  | McIntyre et al. ............ 156/280 |
| 5,211,984 | A |   | 5/1993  | Wilson ......................... 427/115 |
| 5,272,017 | A |   | 12/1993 | Swathirajan et al. ........... 429/33 |
| 5,316,871 | A |   | 5/1994  | Swathirajan et al. ........... 429/33 |
| 5,399,184 | A |   | 3/1995  | Harada ....................... 29/623.4 |
| 5,472,799 | A |   | 12/1995 | Watanabe ...................... 429/30 |
| 5,474,857 | A |   | 12/1995 | Uchida et al. ................. 429/33 |
| 5,702,755 | A |   | 12/1997 | Mussell ....................... 427/115 |
| 6,093,502 | A | * | 7/2000  | Carlstrom et al. ............. 429/25 |
| 6,921,598 | B2 | * | 7/2005 | Yamamoto et al. ............ 429/34 |
| 2002/0187374 | A1 |   | 12/2002 | Yamauchi et al. ............ 429/22 |
| 2003/0031908 | A1 |   | 2/2003  | Bostaph et al. ................ 429/30 |
| 2005/0100774 | A1 | * | 5/2005 | Abd Elhamid et al. ....... 429/34 |

FOREIGN PATENT DOCUMENTS

| WO | WO 00/68463    | 11/2000 |
| WO | WO 00/68463 A3 | 11/2000 |

* cited by examiner

*Primary Examiner*—Dah-Wei Yuan
*Assistant Examiner*—Monique Wills
(74) *Attorney, Agent, or Firm*—Licata & Tyrrell P.C.

(57) ABSTRACT

Fuel cells equipped with a self-contained gas- or air-lift which circulates fuel through the channels of the separator plate of the fuel cell via gaseous carbon dioxide produced by the reaction of the membrane electrode assembly and the fuel are provided. Also provided are exemplary self-contained gas-or air-lifts useful for production of these fuel cells.

3 Claims, 5 Drawing Sheets

FUEL-CELL REACTANT DELIVERY AND CIRCULATION DEVICE

This patent application claims the benefit of priority from U.S. Provisional Patent Application Ser. No. 60/525,805, filed Nov. 28, 2003, which is herein incorporated by reference in its entirety.

FIELD OF THE INVENTION

This invention relates to solid polymer electrolyte fuel cells using liquid fuels such as methanol and more particularly to polymer electrolyte membrane (PEM) stacks wherein a conducting separator plate equipped with a self-containing gas-lift or pump is used to facilitate mass transport of reactants to the reactive surfaces. In order to maintain the electrolytic conversion process to control cell temperature and to conveniently exhaust the reaction product away, it is necessary to forcibly transport the fluid fuel medium throughout the cell stack. The present invention provides a means for ensuring circulation of the methanol fuel and the reaction products by essentially passive means of a self-contained gas-lift whereby the drain on power output and the necessity to service moving devices such as pumps and valves is avoided thus enhancing the security of operating cells as stand alone devices in remote places for extended periods in particular as stand-alone supply means.

BACKGROUND OF THE SUMMARY

Fuel cells are electrochemical energy conversion devices considered as a possible alternative to internal combustion engines. Fuel cells convert a hydrogen containing fuel to electrical energy by an oxidation reaction. A by-product of this reaction is water.

One type of fuel cell comprises a solid polymer electrolyte (SPE) membrane, such as a sulfonated fluorinated polymer membrane material known as Nafion, which provides ion exchange between the cathode and anode electrodes. Various configurations of SPE fuel cells as well as methods for their preparation have been described. See e.g. U.S. Pat. No. 4,469,579; U.S. Pat. No. 4,826,554; U.S. Pat. No. 5,211,984; U.S. Pat. No. 5,272,017; U.S. Pat. No. 5,316,871; U.S. Pat. No. 5,399,184; U.S. Pat. No. 5,472,799; U.S. Pat. No. 5,474,857; and U.S. Pat. No. 5,702,755.

The need to provide an appropriate output voltage entails the assembly of many cells, connected in series, into cell stacks. The individual cells are inter-connected by means of a separating interconnection element. The separating interconnection elements also serve the purpose of providing means of transporting reactants and products to and from the cell and thus may be termed as a flow-plate or additionally as a means of managing the heat output of the cell by transfer of heat to the surroundings. Separator plates are manufactured from conducting carbon composites, such as that supplied as SIGRACET Bipolar Plate BMA 5 by SGL Carbon, Meitingen, Federal Republic of Germany and designed and manufactured for use as for one single electrode process.

To obtain high energy densities in Direct Methanol Fuel Cells it is necessary to circulate the methanol fuel to enhance mass transport of reactants to the catalyst by maintaining the lowest possible thickness of the boundary layer. Circulation is generally provided by pumps, which are energy consuming and require maintenance.

SUMMARY OF THE INVENTION

The present invention provides a fuel cell that utilizes the product of the methanol oxidation electrode, gaseous carbon dioxide, as the primary mover to circulate the fuel feed throughout the cell stack. In the present invention, gaseous carbon dioxide is released into an appropriately formed tube in the form of bubbles. These bubbles fill the tube and rise due to density discrepancies, thereby creating an upward flow and serving as a self-contained gas-lift or pump. In a preferred embodiment, carbon dioxide is released by a terminating separation and concentration control device into the separator plate of a fuel cell. The separator plate comprises a flow field having formed channels designed to provide a prime mover for the fuel feed driven by the force of the gaseous carbon dioxide formed. Thus, the pumping action is self-adjusting to the power demand that the cell stack is subject to and the system is self-regulating.

DETAILED DESCRIPTION OF THE INVENTION

The present invention relates to solid polymer electrolyte fuel cell stacks equipped with a self-contained gas-lift or pump to facilitate transport of fuel through the fuel cell stack. In this invention, the self-contained gas-lift or pump circulates the fuel through the fuel cell by essentially passive means thereby decreasing any drain on power output and avoiding the necessity to service moving devices such as pumps and valves. Accordingly, the fuel cell and gas-or air-lift or pump of the present invention is particularly useful in stand alone devices for use in remote places for extended periods.

Figure 1:
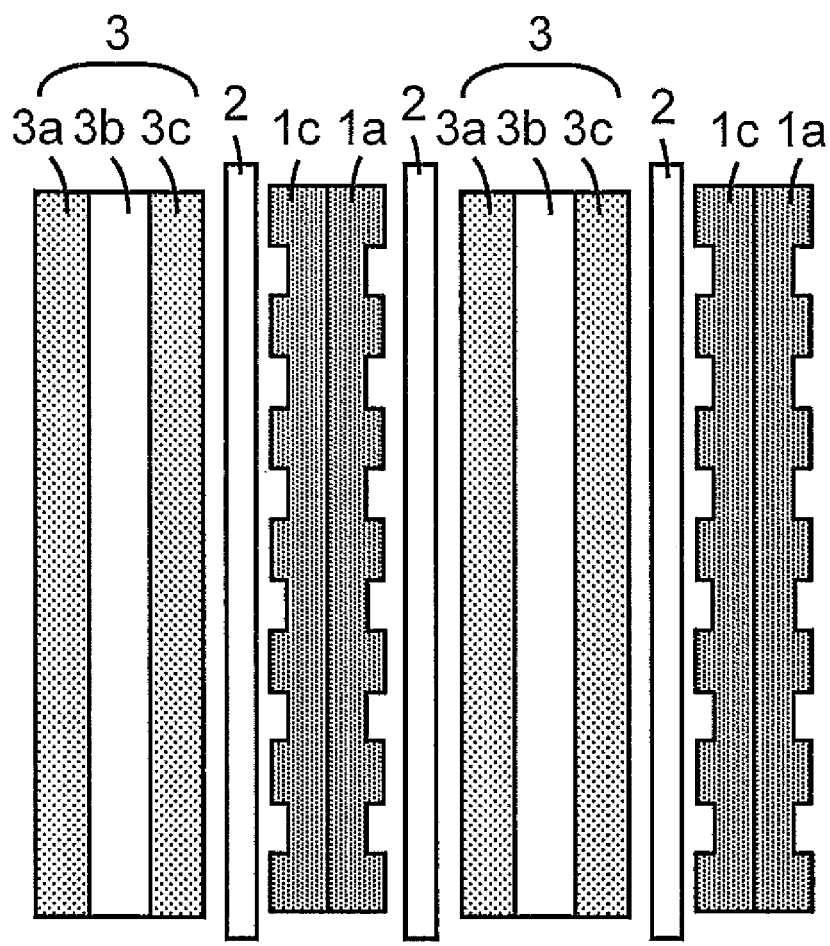
FIG. 1 provides a diagram of the elements of a fuel cell stack.

A single standard fuel cell is depicted in FIG. 1. As shown in FIG. 1, in the standard fuel cell, a cathode 3a, a solid polymer electrolyte (SPE) layer 3b and an anode 3c are bonded together to form a membrane-electrode assembly 3 or MEA. A porous conductive layer 2, such as a carbon cloth such as Sigracet Gas diffusion Layer, Type GDL 10-HM (available from SGL Carbon GmbH Meitingen, Federal Republic of Germany), is placed in contact with the MEA 3 and separator plates 1a and 1c are placed on each side. Separator plates 1a and 1c contain channels in which reactants flow and diffuse to the MEA 3 via the conductive porous layer 2.

The fuel cell depicted in FIG. 1 can be connected in series to other fuel cells by repeating the sequence described above so that a multiplicity of single cells form a fuel cell stack. Connection of such fuels cells is performed routinely by those skilled in the art.

The cathodic and anodic reactants of the fuel cell are different and thus have different properties. Thus, the flow pattern and channel configuration and design of the fuel cell is adapted to the particular material being transported to the MEA via the channels in the separator plates. In a conventional cell, a system of apertures in the separator plates form a common supply channel for each of the reactants and traverses the stack, thus supplying reactants to each cell via apertures arranged on the appropriate separator surface. Thus, oxidant is supplied to the cathode where reduction occurs and a hydrogen containing fuel such as hydrogen or methanol is supplied to the anode where oxidation occurs.

Figure 2:
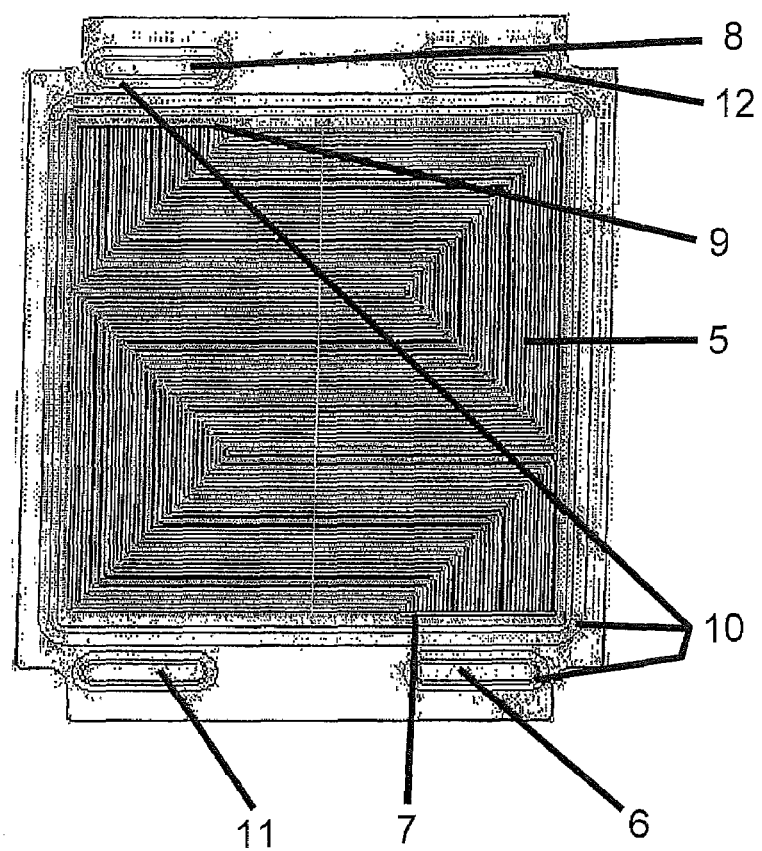
FIG. 2 provides a detailed drawing of a separator plate for the anode portion of the fuel cell.

FIG. 2 provides a diagram of a typical separator plate 1a for the anode side of the fuel cell. The fuel is distributed to the anode flow channels 5 via the orifice 7. The fuel is fed from the fuel feed channel 6 via a chamber formed on the anterior side of the anode plate that is enclosed and sealed by the plane surface of the posterior face of the succeeding cathode plate. The expended fuel is exhausted to the fuel outflow channel 8 via a similar orifice 9. All fluids are contained and enclosed by the use of seals 10. The apertures 11 and 12 serve as the corresponding oxidant feed channel and exhaust channel and are passive on the anode side but work in an analogous manner for the cathode plate. Convective mass transport of air can also conveniently be enhanced by the provision of a chimney for use where stand-alone utilization makes the avoidance of maintenance demanding ancillary equipment desirable. Seals 10 preferably comprise a molded elastomeric sealing member that seals the periphery of all fluid channels and the periphery of the electrolytic cell. Thus, a cell-separator inter-connecting sandwich is formed comprising the anodic and cathodic separator plates in a repeating pattern throughout the cell stack. The stack is terminated by an anode and cathode current collector.

Various separator designs are known to those skilled in the art and provide a single interconnecting plate with appropriate flow fields and seals replacing the separator sandwich described above.

In the present invention, the fuel cell further comprises a gas-or air-lift or pump which functions due to the flotation force derived from bubbles of $CO_2$ forming at the electrode as a reaction product of the oxidation of a fuel such as methanol at the anode. The rate of release depends on the current delivered by the cell so that when a demand for increased fuel arises due to the current drain the rising action of the bubbles enclosed in the channels of the flow field of the separator plate draws renewed supply of fuel to the electrode. In order to maintain a flow of fuel without causing gas-locks in the flow field it has been found appropriate to design the flow field of the separator plate so that channels are optimally dimensioned at any point along the flow path.

Figure 3:
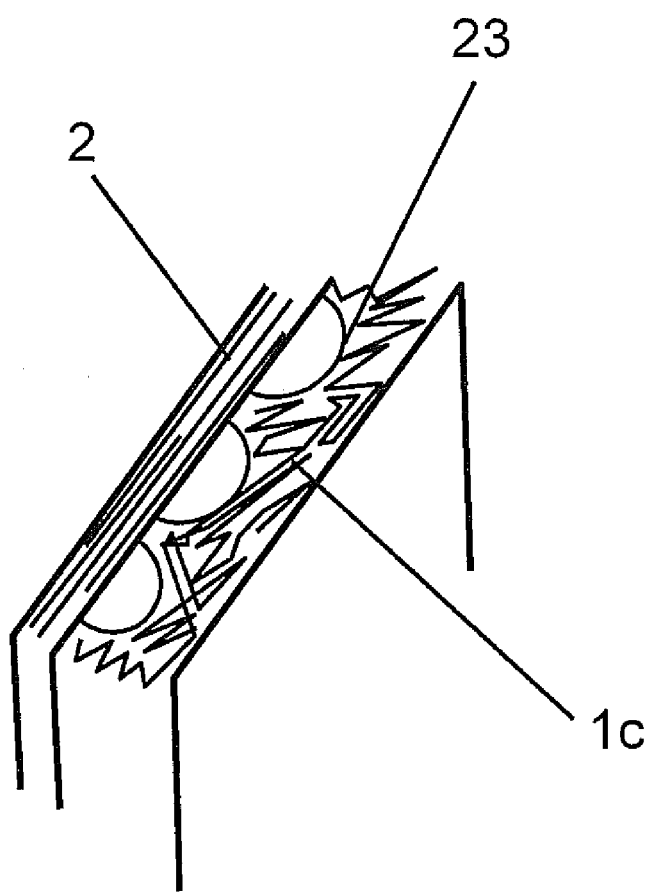
FIG. 3 shows a cross-sectional view of a separator plate and flow channel configuration used in the present invention.

FIG. 3 provides a cross-sectional view of the arrangement of the flow channels used in an exemplary fuel cell of the present invention. A separator plate 1c has channels with a circular section and a diameter of 1.2 mm, which form cathode flow channels 23 in the separator surface. A porous diffusion layer consisting of conducting carbon cloth 2 covers the channels.

In a preferred embodiment of the present invention, to establish flow at low current drains the initial part of the flow field is optionally dimensioned, for example, with a reduced cross-sectional area in the first part of the rise height. For example channel size may be reduced from 1.2 mm to 0.5 for the first 25 mm of rise height wherein fuel and carbon dioxide bubbles enter the plate and thereafter be increased to 1.2 mm over the next 25 mm wherein fuel and carbon dioxide bubbles exit the plate. Further, the channels of the exit ports can be further increased to dimensions of 1.8 mm.

In another preferred embodiment of the present invention, the surface of the separator plate is modified to promote adherence of water to the separator plate. Various surface modifying agents well known to those skilled in the art can be used for this purpose. For example, in one embodiment, the separator surface is treated with an aminosilane product that enhances hydrophilicity. Examples of such products include, but are in no way limited to Dow Corning Z6020 and Union Carbide A1100, both known to enhance hydrophilicity. Improved water adhesion can also be obtained by treating the separator surface with ionizing radiation such as that generated in an electron beam generator. A suitable process subjects the upper portion of the separator surface to electron beam radiation. For example, an electron beam generator running at a voltage of about 150 kV, a current of about 1.5 $mA/cm^2$ and a forward speed of about 5 meters per minute can be used to subject the upper 25 mm of a separator anode side surface to electron radiation. Separator surfaces treated in this way show increased affinity to water so that the adhesion of gas bubbles to the separator surface is reduced compared to non-treated materials.

Figure 4:
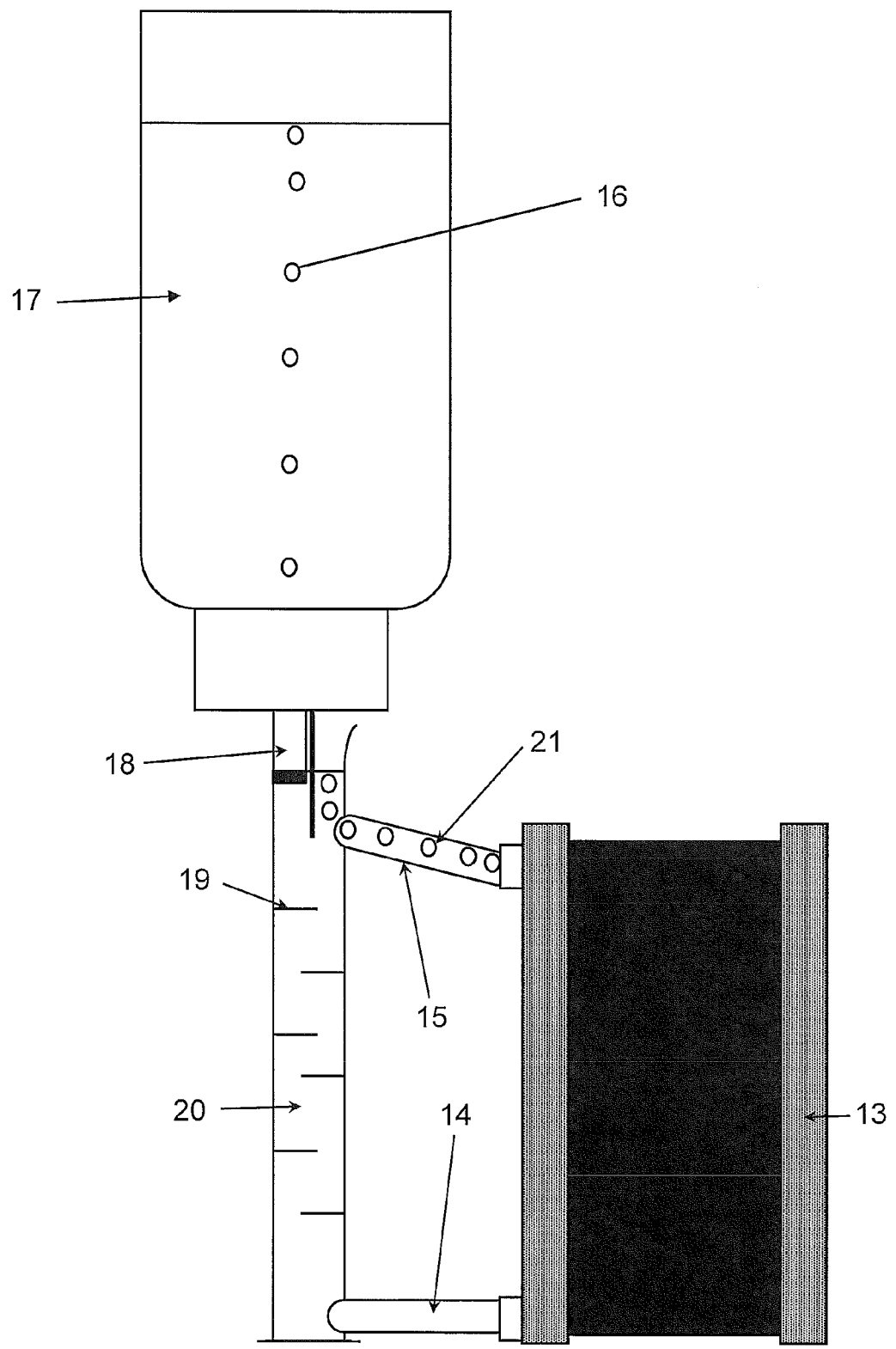
FIG. 4 provides a diagram of one embodiment of the present invention wherein a stand-alone fuel cell stack consisting of five stacked single fuel cells is equipped with a self-contained gas-or air-lift for fuel circulation via carbon dioxide bubbles.

An exemplary stand-alone fuel cell stack consisting of multiple stacked single fuel cells and a self-contained gas- or air-lift for fuel circulation is depicted in FIG. 4. In this embodiment, the fuel cell stack 13 is fitted with anodic separator plates having a working height of approximately 140 mm and a width of 120 mm so that the effective cell area is 168 $cm^2$. The channels in the anodic separator plate are vertically arranged and are semi-circular with a diameter of 1.2 mm. However, as will be understood by those of skill in the art upon reading this disclosure, the dimensions of the separator plates as well as the arrangement of the channels may be modified to facilitate lifting of the fuel via the gas bubbles as well as purging of the gas bubbles when necessary. Preferably fuel of this cell comprises between 1 to 10%, more preferably 1-5% and most preferably 1 to 3% fuel. Alcohol fuels such as methanol are most commonly used. However alternative fuels capable of serving as a hydrogen donor can be used. Air is provided as forced circulation driven by a ventilator powered by the cell output. An entry tube 14 and an exit tube 15 feed fuel to and from the cell, respectively. Entrained bubbles of $CO_2$ 21 are led to a storage and recirculation receptacle 20. An inverted receptacle 17 contains fuel concentrate with a fuel concentration ranging preferably from 100% to 2%, more preferably 75% to 10% and most preferably ranging from 60% to 40%. Selection of the percent of fuel concentrate will be dependent upon cell operating conditions and cell temperature. Bubbles of air 16 compensate for the volume drain via delivery tube 18 of concentrated methanol, which serves to replenish lost methanol and water during the operation of the fuel cell stack. The delivery tube 18 is extended to the level required to maintain adequate fluid terminate at the liquid level required in the fuel cells. When consumption makes the liquid level drop, compensation is achieved by drawing air into the reservoir which then allows for the outflow down the delivery tube, thus maintaining the specified fluid levels in the cells. As the level rises thereafter the delivery tube closes off any further compensating air entry and the system attains its stability again. Optional baffles 19 can be provided with the storage and recirculation receptacle 20 to ensure proper mixing. Thus, the stack is provided with a passive replenishment system enabling large quantities of replenishing fuel to be supplied so that long stand-alone operation durations may be achieved.

Figure 5:
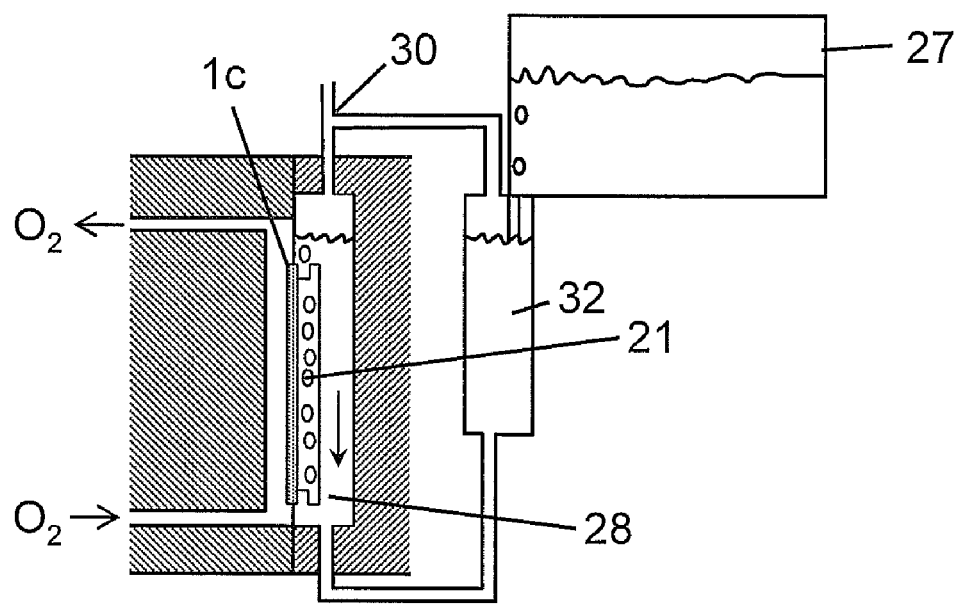
FIG. 5 provides a diagram of a second embodiment of the present invention wherein the fuel cell is equipped with a different configuration of a self-contained gas-or air-lift for fuel circulation via carbon dioxide bubbles.

An alternative embodiment of a stand-alone fuel cell stack equipped with a self-contained gas-or air-lift for fuel circulation is depicted in FIG. 5. This embodiment, as depicted in FIG. 5, utilizes an extended fluid chamber 28 containing preferably between 1 to 10%, more preferably 1-5% and most preferably 1 to 3% fuel. Alcohol fuels such as methanol are most commonly used. However alternative fuels capable of serving as a hydrogen donor can be used. Circulation of fuel to the fuel cell is maintained by the gas lift established in the channels of the separator plate 1c. Bubbles of $CO_2$ 21 are formed and float to the surface where they are vented via a venting means 30 to the atmosphere. The fluid level is maintained by a feed established from an inverted receptacle 27 whose outlet 32 is adjusted to the level required in the fuel cell assembly. This integrates the recirculation device in the same enclosure as the fuel cell.

As will be understood by those of skill in the art upon reading this disclosure, however, alternative means for providing a gas- or air-lift or pump to circulate gaseous carbon dioxide produced by reaction of the MEA with the fuel through the channels of a separator plate, thereby moving fuel through the fuel cell, can be used.

The following nonlimiting example is provided to further illustrate the present invention.

EXAMPLES

A stand-alone fuel cell stack consisting of five stacked single fuel cells and a self-contained gas- or air-lift for fuel circulation was developed in accordance with the diagram of FIG. 4. The fuel cell stack was fitted with anodic separator plates having a working height of approximately 140 mm and a width of 120 mm so that the effective cell area is 168 $cm^2$. The channels in the anodic separator plate were vertically arranged and were semi-circular in section with a diameter of 1.2 mm. The fuel used had a methanol concentration of 2% by weight. Power supplied and the corresponding current and electromotive force from the fuel cell stack was monitored over an 8 hour period and provided a peak power output of 26.5 Watts and an average output of 17 Watts at a voltage of 2.17 volts. The peak current drawn at a voltage of 1.0 volts was 23.4 amps.

What is claimed is:

1. A fuel cell comprising a membrane-electrode assembly, a porous conductive layer adjacent to and in contact with the membrane-electrode assembly, a separator plate adjacent to the porous conductive layer, said separator plate containing channels in which fuel flows and diffuses to the membrane-electrode assembly via the conductive porous layer and a self contained gas- or air-lift which circulates fuel through the channels of the separator plate via gaseous carbon dioxide produced by the reaction of the membrane electrode assembly and the fuel by passive means without moving devices with pumps and valves thereby decreasing any drain on power output.

2. The fuel cell of claim 1 wherein the channels of the separator plate of the fuel cells have a reduced cross-sectional area of the separator plate where the fuel enters as compared to a cross-sectional area of the channels of the separator plate where the fuel exits.

3. The fuel cell of claim 1 wherein a surface of the separator plate is modified to promote adherence of water to the separator plate.

* * * * *